Patented Nov. 29, 1938

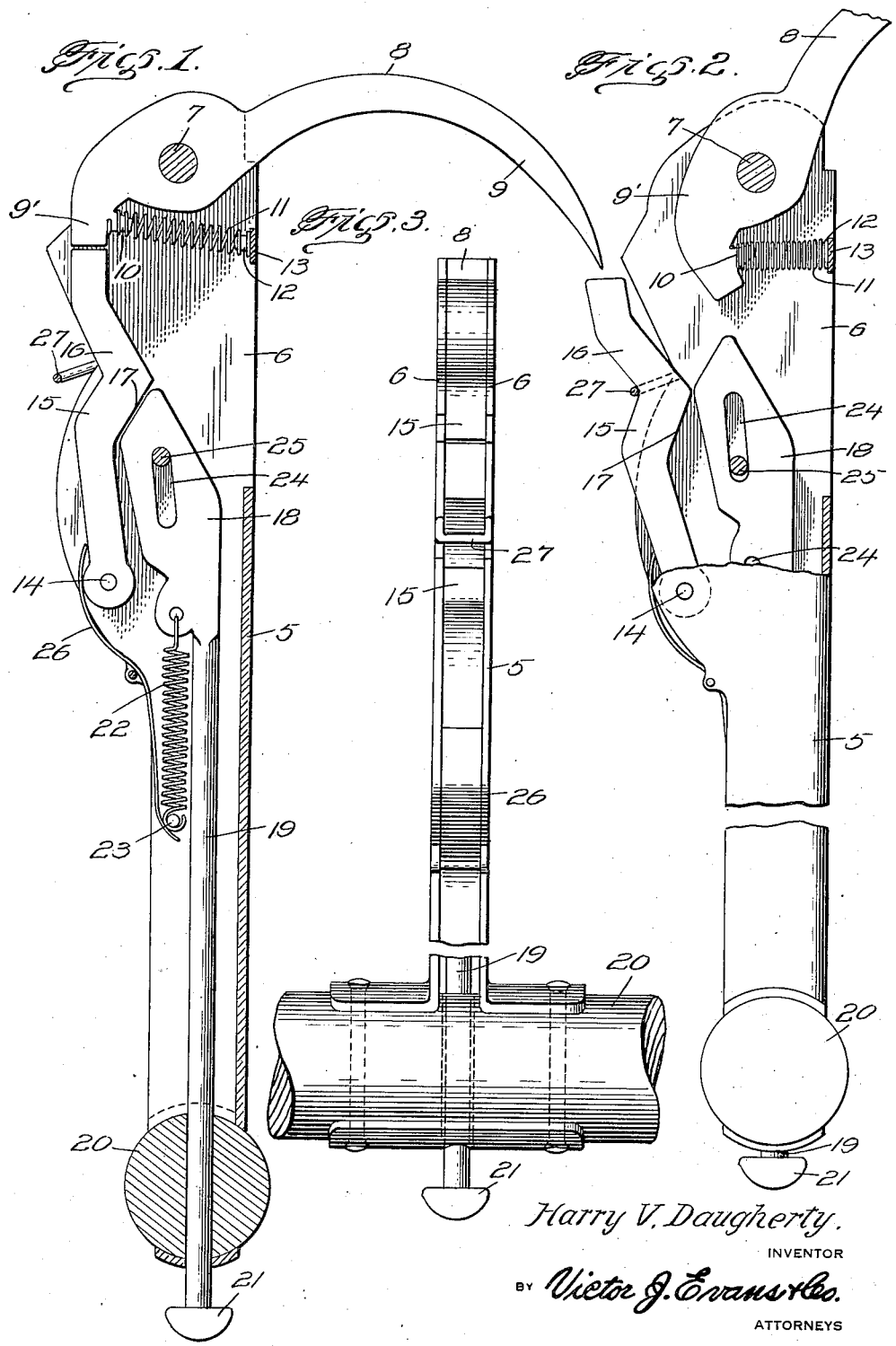

2,138,694

UNITED STATES PATENT OFFICE 2,138,694

AUTOMATIC HAY HOOK

Harry V. Daugherty, Simpson, Kans.

Application September 7, 1937, Serial No. 162,758

1 Claim. (Cl. 294—26)

The invention relates to hooks and more especially to automatic hay hooks.

The primary object of the invention is the provision of a hook of this character, wherein the same can be conveniently and easily engaged in a bale of hay or other material and after the handling of such bale the hook can be readily and easily released, thereby relieving the user of the hook of labor and inconvenience in extracting the hook from the bale, the hook in its construction being novel.

Another object of the invention is the provision of a hook of this character, which is extremely simple in its construction, thoroughly reliable and efficient in operation, readily and easily handled or actuated, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a fragmentary vertical longitudinal sectional view through a hook constructed in accordance with the invention, its hooking tine or prong being in hooking position and latched.

Figure 2 is a side elevation partly in section showing the tine or prong in released or unlatched position.

Figure 3 is an edge elevation of the hook.

Similar reference characters indicate corresponding parts throughout the several views in the drawing.

Referring to the drawing in detail, the hook constituting the present invention comprises a channeled or substantially U-shaped elongated shank 5 having at one end the spaced cheeks 6 supporting a pivot 7, which is disposed crosswise between the cheeks for swingingly supporting a hooking tine or prong 8 preferably curved and having a pointed free end 9, which is effective as a bill. The heel end of the tine or prong 8 is formed with an abutment extension 9' provided with a holding lug 10 about which is fitted one end of a coiled expansion spring 11, the other end being also fitted about a lug 12 projecting from a cross web 13 between the cheeks 6 and integral therewith. This spring 11 functions to dispose the tine or prong 8 laterally to one side of the shank 5 at an angle thereto, which is the hooking position of such tine or prong.

Arranged between the cheeks 6 inwardly with respect to the prong or tine 8 and supported upon a pivot 14 is a latching dog or pawl 15 adapted for latching engagement with the extension 9 at the heel end of said prong or tine and when so engaged latches the latter in hooking position. This dog or pawl 15 is formed with a bight 16 providing a beveled edge 17 with which engages a sliding trigger 18 having an actuating stem 19, which is longitudinally disposed in the shank 5 and plays through a cross handle or grip 20 fixed to the said shank 5. The outer end of the stem is formed with a button head 21.

The trigger 18 has connected with it one end of a coiled tensioning spring 22, the other end of the latter being fixed to an anchoring pin 23 mounted transversely in the shank 5, the trigger being limited in its movement the extent of an elongated slot 24 therein and receiving a stop pin 25 fixedly held in the shank 5.

The dog or pawl 15 has working against the same a leaf spring 26 which urges it into latching position with respect to the extension 9' at the heel end of the tine or prong 8 while straddling this pawl or dog and built on the shank 5 is a stop 27 which limits the swing of the said pawl or dog to unlatching position.

In the use of the hook by hand pressure upon the head 21, the pawl or dog 15 through activity of the trigger 18 will be moved to unlatching position to disengage the extension 9' at the heel end of the prong or tine 8 so that the latter can be thrust into a bale of hay or other material for the hooking of the same so that such bale can be conveniently handled by the hook and thereafter by releasing the pressure upon the head 21, the pawl or dog will latch the tine or prong 8 in hooking position. Now when it is desired to release the hook from the bale, a user of the same again presses the head 21 freeing the tine or prong 8 from engagement by the pawl or dog 15 whence the said tine or prong can be brought into substantial alignment with the shank 5 and thus the said hook can be readily extracted or released from hooking engagement with the bale.

What is claimed is:

An implement of the kind described comprising a channeled substantially U-shaped elongated shank and having spaced cheek formations at one end in parallel relation to each other, a hooking tine pivoted to the shank between said cheeks and having a pointed curved free end for effecting a bill, an abutment extension on said tine at its heel end and disposed at a tangent to the pivotal axis of said tine, a latching dog pivoted in the shank for swing in the path of movement of the abutment extension of said tine and normally engageable with said tine to hold the latter outwardly angled to the shank, a spring fitting said shank and active upon the abutment extension to normally hold the tine angled to the shank, a bight formed in said dog and providing a laterally extending beveled portion thereto, a trigger slidably fitting the shank for contact with the beveled portion of said dog and having an operating handle extending beyond the shank at its end remote from the pivoted tine, and means active upon the dog and the said trigger to hold the same in position for the contact of the beveled portion of said dog with the trigger to have the dog in a latching relation to the abutment extension of the tine and also for the release of the dog from the abutment extension on the shifting of the trigger within said shank in one direction and the riding of the trigger on the beveled portion of said dog.

HARRY V. DAUGHERTY.